United States Patent [19]

Haga et al.

[11] Patent Number: 5,474,145
[45] Date of Patent: Dec. 12, 1995

US005474145A

[54] HYDRAULIC POWER STEERING APPARATUS

[75] Inventors: Kyosuke Haga, Anjo; Miko Suzuki, Hekinan; Kenichi Fukumura, Aichi; Hideya Kato, Okazaki; Seiho Kawakami; Kaname Saito, both of Toyota, all of Japan

[73] Assignees: Toyoda Koki Kabushiki Kaisha, Kariya; Toyota Jidosha Kabushiki Kaisha, Toyota, both of Japan

[21] Appl. No.: 304,923

[22] Filed: Sep. 13, 1994

[30] Foreign Application Priority Data

Sep. 13, 1993 [JP] Japan ................... 5-249741

[51] Int. Cl.$^6$ ........................... B62D 5/06
[52] U.S. Cl. ........................... 180/132; 180/141
[58] Field of Search ........................... 180/132, 141

[56] References Cited

U.S. PATENT DOCUMENTS

| | | | |
|---|---|---|---|
| 4,332,303 | 6/1982 | de Maight | 180/132 |
| 5,147,007 | 9/1992 | Kahrs et al. | 180/132 |
| 5,184,691 | 2/1993 | Keutner | 180/132 |
| 5,372,214 | 12/1994 | Haga et al. | 180/132 |

FOREIGN PATENT DOCUMENTS

| | | |
|---|---|---|
| 2126085 | 12/1972 | Germany . |
| 4319495 | 12/1993 | Germany . |

OTHER PUBLICATIONS

Olhydraulik und Pneumatik, vol. 28, No. 8, Aug. 28, 1984, pp. 493–497, H. W. Krueger, et al., "Modern Lenkhelfpumpen".

*Primary Examiner*—Mitchell J. Hill
*Attorney, Agent, or Firm*—Oblon, Spivak, McClelland, Maier & Neustadt

[57] ABSTRACT

A hydraulic power steering system includes a pump, a flow control valve, and a bypass control valve. The flow control valve responds to a pressure drop across a metering orifice disposed in a fluid supply passage so as to control the flow rate of operational fluid by bypassing part of the operational fluid to a reservoir. A spring chamber of the flow control valve is connected to the supply passage through a control orifice. The bypass control valve is disposed between the spring chamber and the reservoir so as to increase the amount of bypassed fluid by controlling the pressure in the spring chamber. The bypass control valve has a control spool, a load pressure introduction port connected to the upstream side of the control orifice for leading the load pressure to a first end of the control spool and a pilot port connected to the downstream side of the control orifice for leading the pressure in the spring chamber of the flow control valve to a second end of the control spool. Moreover, a pressure receiving area of the second end of the control spool is smaller than that of the first end of the control spool. Accordingly, a spring having a small spring constant can be used in the bypass control valve, even when the control spool is controlled within a short stroke.

7 Claims, 6 Drawing Sheets

HYDRAULIC POWER STEERING APPARATUS

BACKGROUND OF THE INVENTION

1. Field of the Invention

The present invention relates to a hydraulic power steering apparatus suitable for use in automobiles and the like.

2. Discussion of Related Art

Figure 1:
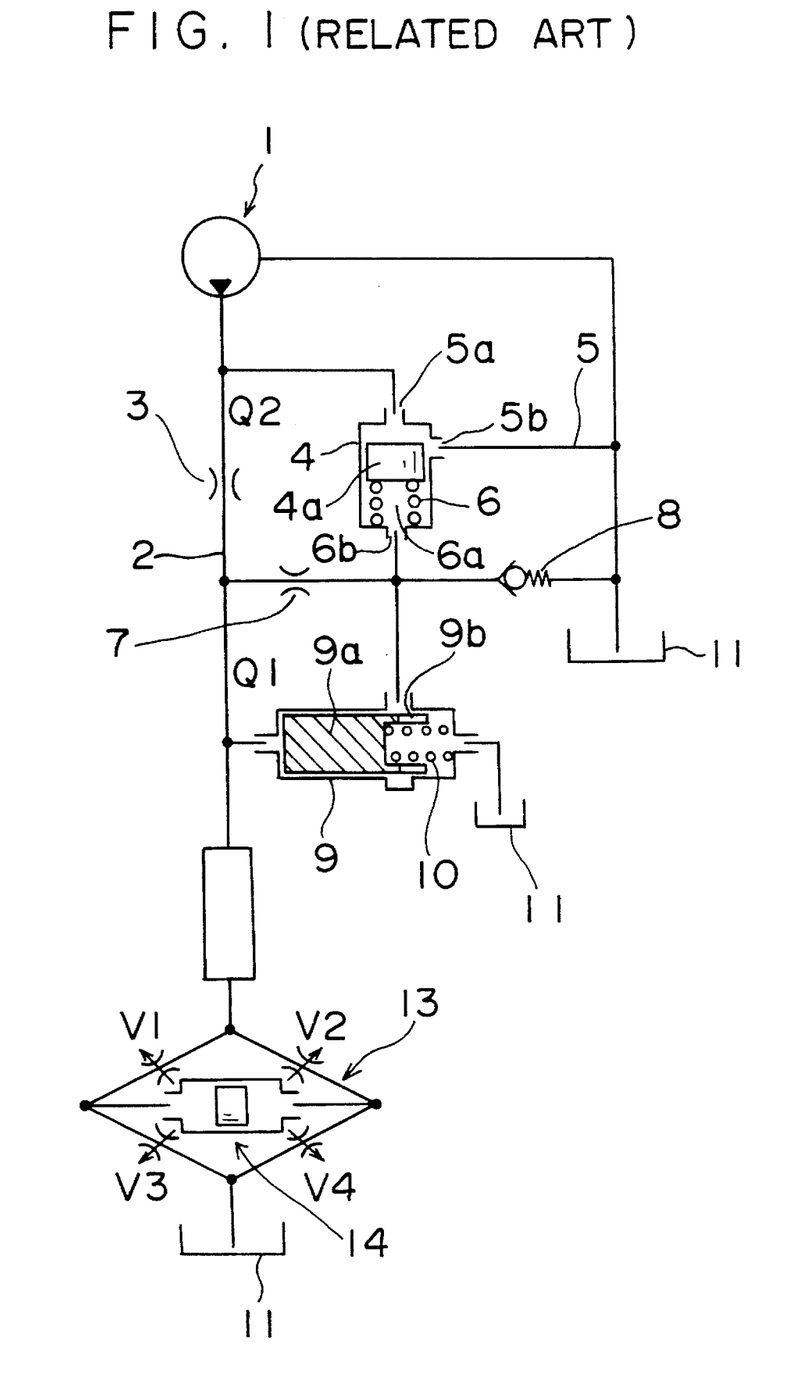
FIG. 1 is a diagram showing the overall structure of a conventional hydraulic power steering apparatus.

FIG. 1 shows a conventional hydraulic power steering apparatus in which a bypass control valve is employed to reduce the energy consumption. The power steering apparatus comprises a pump 1, a power cylinder 14, a reservoir 11, and a control valve 13. This control valve 13 is provided with variable throttles V1, V2, V3 and V4 disposed in four passages which are connected to the pump 1, a pair of chambers of the power cylinder 14 and the reservoir 11 and which form a bridge circuit. The power steering apparatus further comprises a flow control valve 4 and a bypass control valve 9.

The flow control valve 4 is composed of a valve spool 4a and a spring 6 disposed in a spring chamber 6a formed at the back of the valve spool 4a. The flow control valve 4 is disposed in a bypass passage 5 and the flow of fluid flowing from an inlet port 5a to an outlet port 5b of the flow control valve 4 is controlled by the valve spool 4a. A connection port 6b of the spring chamber 6a is connected to a supply passage 2 via a control orifice 7 and to the reservoir 11 via a relief valve 8. The valve spool 4a responds to a pressure difference between the upstream side and downstream side of a metering orifice 3 disposed in a supply passage 2 which connects the pump 1 and the control valve 13 so that the bypass passage 5 is opened and closed by the valve spool 4a in accordance with the pressure difference, thereby maintaining the flow rate of operational fluid supplied to the control valve 13 constant. The connection port 6b of the spring chamber 6a is also connected to the reservoir 11 via the bypass control valve 9 which is composed of a control spool 9a having slits 9b at its rear end and a spring 10 disposed at the back of the control spool 9a. The slits 9b form a variable orifice which controls the flow of operational fluid flowing to the reservoir 11. The bypass control valve 9 is also connected to the supply passage 2 so that the back pressure of the control valve 13, i.e., load pressure is lead to the front side of the bypass control valve 9. When the back pressure of the control valve 13 is low, i.e., the control valve 13 is in a neutral state, the control spool 9 is moved to the left as viewed in FIG. 1 so that the variable orifice is fully opened. With this operation, the pressure in the spring chamber 6a of the flow control valve 4 is lowered so that the valve spool 4a is displaced to open the bypass passage 5 much more. As a result, the energy consumed by the pump 1 can be reduced.

The bypass control valve 9, however, has the following drawbacks. When the control valve 13 is operated, a very high pressure (the pressure of operational fluid at the time when discharged from the pump 1) acts on the front end surface of the control spool 9a while an atmospheric pressure (the pressure of operational fluid at the time when sucked by the pump 1) acts on the rear end surface of the control spool 9a. Due to this large pressure difference, the spring 10 must have a large spring constant in the case where it is required to control the control spool 9a within a short stroke. When the spring constant of the spring 10 is made larger, adversary effects caused by variations in the axial position of the spring become large. This hinders accurate operation. Moreover, in order to secure that each spring has the same spring constant, selection of springs is required, thereby increasing production costs.

SUMMARY OF THE INVENTION

An object of the present invention is to provide an improved hydraulic power steering apparatus having a bypass control valve which accurately operates and which can be manufactured at a low cost.

Another object of the present invention is to provide an improved hydraulic power steering apparatus having a bypass control valve which uses a spring having a smaller spring constant compared to conventional bypass control valves, thereby eliminating the necessity of selection of springs.

Briefly, a hydraulic power steering according to the present invention comprises a pump for supplying a pressurized fluid, a power cylinder, a reservoir, a control valve, a metering orifice disposed in the middle of a supply passage connecting the pump and the control valve, a flow control valve, and a bypass control valve. The control valve is connected to the pump, the power cylinder and the reservoir and responds to steering operation so as to control supply of the pressurized fluid to the power cylinder.

The flow control valve is disposed in a bypass passage connected to the supply passage at the upstream side of the metering orifice, and has a valve spool and a spring disposed in a spring chamber formed at the back of the valve spool and connected to the supply passage at the downstream side of the metering orifice via a control orifice so as to open and close the bypass passage in accordance with a pressure drop across the metering orifice. The bypass control valve is disposed between the spring chamber of the flow control valve and the reservoir so as to increase the amount of bypassed fluid by controlling the pressure in the spring chamber. The bypass control valve has a control spool, a load pressure introduction port connected to the upstream side of the control orifice for leading load pressure to a first end of the control spool, a pilot port connected to the downstream side of the control orifice for leading the pressure in the spring chamber to the second end of the control spool, and a spring disposed in a chamber formed between the control spool and the pilot port. Moreover, a pressure receiving area of the second end of the control spool is smaller than that of the first end of the control spool.

In the present invention, the control spool of the bypass control valve is provided with two opposite ends having different pressure receiving areas, and the control spool is controlled in accordance with differential pressure generated at the control orifice connecting the supply passage and the spring chamber of the flow control valve. Accordingly, a spring having a small spring constant can be used in the bypass control valve, even when the control spool is controlled within a short stroke. This reduces the adversary effects caused from variations in the axial mounting position of the spring, and eliminates the necessity of selection of springs so that the production costs can be lowered. In addition, the flow rate can be controlled accurately.

BRIEF DESCRIPTION OF THE ACCOMPANYING DRAWINGS

Various other objects, features and many of the attendant advantages of the present invention will be readily appreciated as the same becomes better understood by reference to the following detailed description of the preferred embodiments when considered in connection with the accompanying drawings, in which.

DETAILED DESCRIPTION OF PREFERRED EMBODIMENTS

Embodiments of the present invention will now be described with reference to the accompanying drawings.

Figure 2:
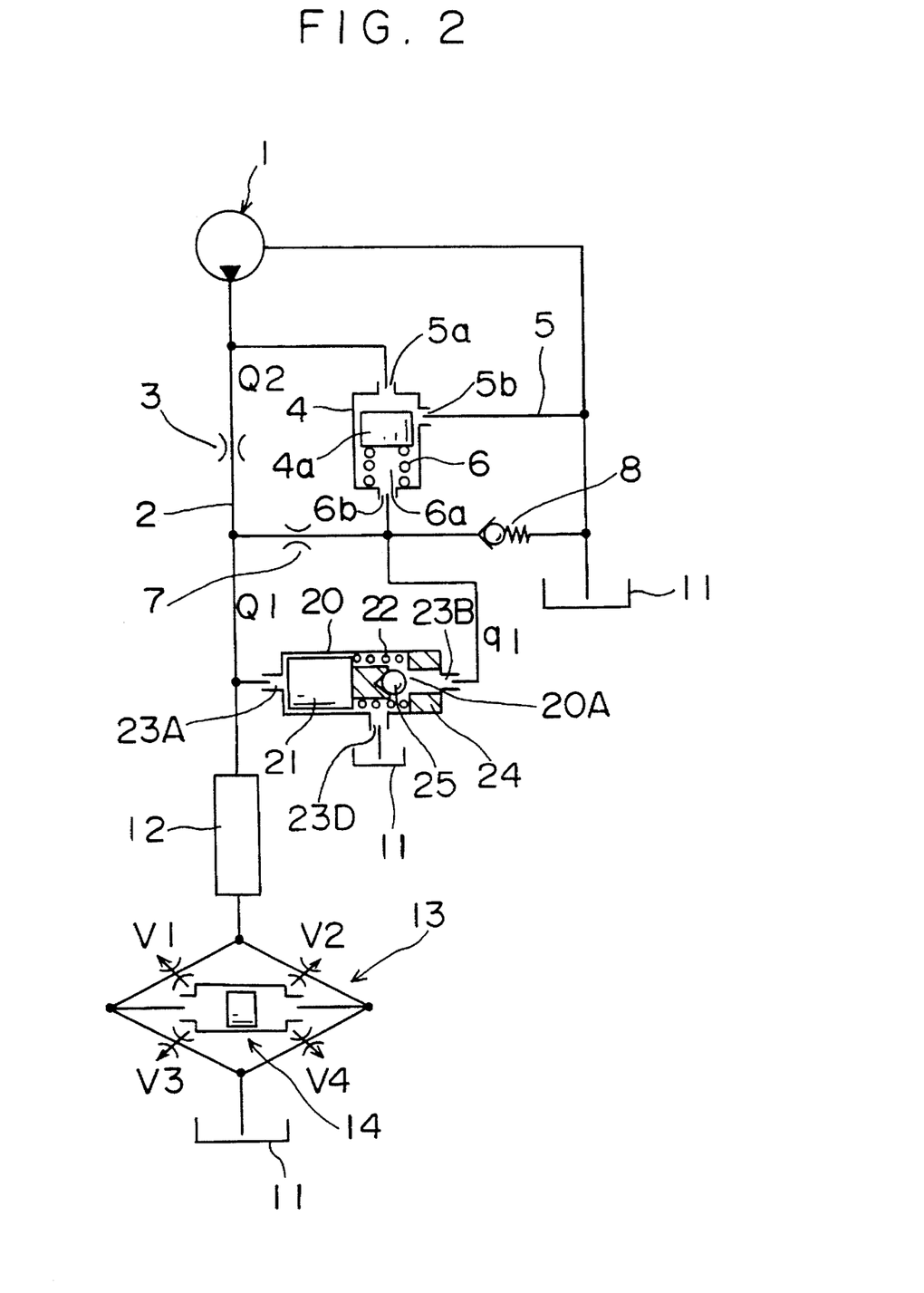
FIG. 2 is a diagram showing the overall structure of a power steering apparatus according to a first embodiment of the present invention.

FIG. 2 shows the overall structure of a hydraulic power steering apparatus according to a first embodiment of the present invention. The power steering apparatus comprises a pump 1, a power cylinder 14, a control valve 13, and a reservoir 11. The pump 1 is driven by an unillustrated engine of an automobile. The control valve 13 is provided with variable throttles V1, V2, V3 and V4 disposed in four passages which are connected to the pump 1, a pair of chambers of the power cylinder 14 and the reservoir 11 and which form a bridge circuit.

The control valve 13 is connected to the pump 1 via a supply passage 2 formed in an unillustrated pump housing and a pressure hose 12. A metering orifice 3 is disposed in the middle of the supply passage 2.

The power steering apparatus further comprises a flow control valve 4 and a bypass control valve 20 of a ball poppet type.

A bypass passage 5 is branched from the supply passage 2 on the upstream side of the metering orifice 3, and the flow control valve 4 having a valve spool 4a and a spring 6 is disposed in the bypass passage 5. In detail, an inlet port 5a of the flow control valve 4 is connected to the supply passage 2 on the upstream side of the metering orifice 3, while an outlet port 5b of the flow control valve 4 is connected to the reservoir 11 to complete the bypass passage 5. The valve spool 4a controls the flow of fluid flowing from the inlet port 5a to the outlet port 5b. The spring 6 is disposed in a spring chamber 6a formed at the back of the valve spool 4a so as to urge the valve spool 4a in a direction for closing the bypass passage 5. A connection port 6b of the spring chamber 6a is connected to the supply passage 2 via a control orifice 7 and to the reservoir 11 via a relief valve 8. The valve spool 4a responds to a pressure difference between the upstream side and downstream side of the metering orifice 3 disposed in the supply passage 2 so that the bypass passage 5 is opened and closed by the valve spool 4a in accordance with the pressure difference, thereby maintaining the flow rate of operational fluid supplied to the control valve 13 constant.

The connection port 6b of the spring chamber 6a is also connected to the reservoir 11 via the bypass control valve 20. The bypass control valve 20 is provided with a load pressure introduction port 23A at one end and a pilot port 23B at the other end. The load pressure introduction port 23A is connected to the upstream side of the control orifice 7, while the pilot port 23B is connected to the down stream side of the control orifice 7. The bypass control valve 20 comprises a control spool 21 having a first end facing the load pressure introduction port 23A, a ball 25 disposed on a second end of the control spool 21 opposite to the first end, a valve sheet member 24 disposed adjacent to the pilot port 23B and to which the ball 25 contacts, and a spring 22 disposed between the control spool 21 and the valve sheet member 24 to urge the control spool 21 in a direction such that the ball 25 is separated from the valve sheet member 24. The valve sheet member 24 is provided with a passage communicating with the pilot port 23B, and the ball 25 contacts an inner opening of the passage to form a pressure receiving area smaller than the first end of the control spool 21. A chamber formed between the control spool 21 and the valve sheet member 24 is connected to the reservoir 11 through a drain port 23D.

Figure 4:
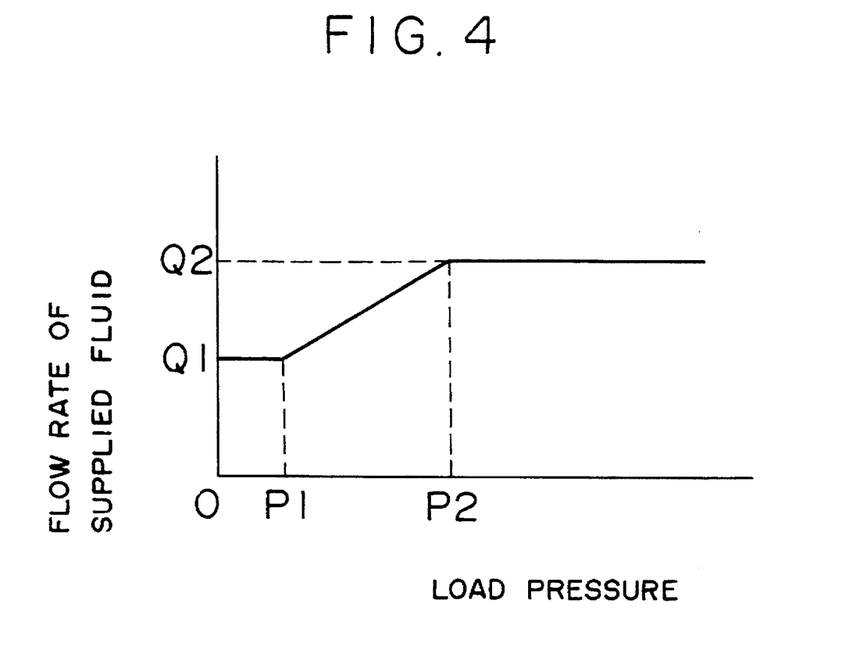
FIG. 4 is a graph showing the relationship between load pressure and the flow rate of fluid supplied to the control valve.

When the control valve 13 is in its neutral state, the load pressure is at a low level P1 so that only a small differential pressure is produced across the control orifice 7. In such a case, a variable throttle 20A of the bypass control valve 20 is fully opened due to the spring force of the spring 22. As a result, the spring chamber 6a of the flow control valve 4 communicates with the reservoir 11 so that the pressure in the spring chamber 6a is lowered. This causes the valve spool 4a to retract so as to open the bypass passage 5. Accordingly, the operational fluid discharged from the pump 1 is mostly bypassed to the reservoir 11. With this operation, the flow rate of the operational fluid supplied to the control valve 13 is reduced to the lowest flow rate Q1, as shown in FIG. 4.

Figure 3:
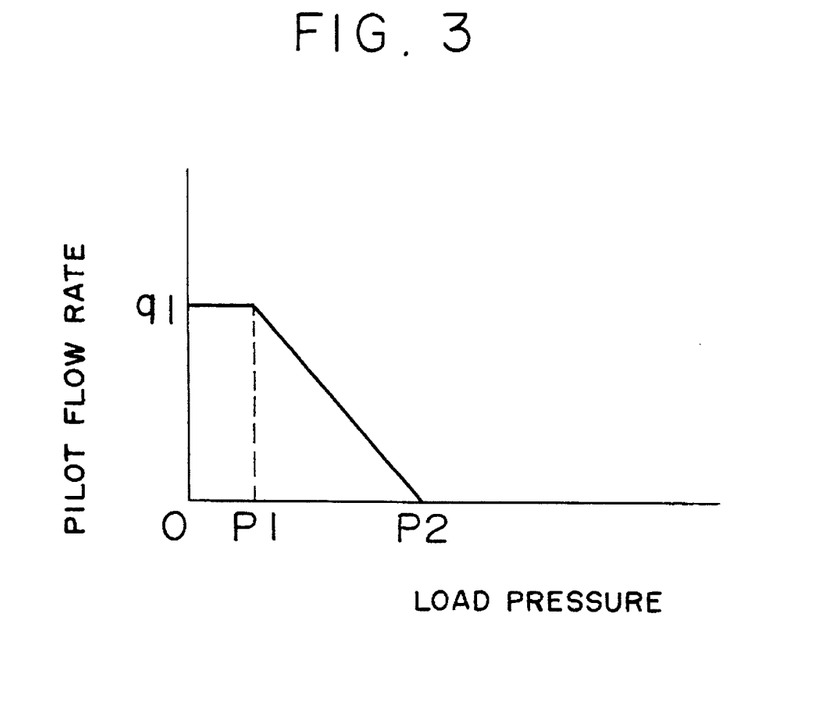
FIG. 3 is a graph showing the relationship between load pressure and pilot flow rate.

When an unillustrated steering wheel is rotated, the opening areas of one pair of variable orifices V1 and V4 are increased, while the opening areas of the other pair of variable orifices V2 and V3 are decreased. As a result, the back pressure of the control valve 13, i.e., load pressure gradually increases. When the load pressure increases, the differential pressure produced across the control orifice 7 increases. When the differential pressure reaches a predetermined level, the control spool 21 is moved toward the pilot port 23B against the spring force of the spring 22, thereby decreasing the opening area of the variable throttle 20A. When the differential pressure produced at the control orifice 7 is further increased due to a further increase of the load pressure, the control spool 21 of the bypass control valve 20 closes the pilot port 23B so that the flow rate q of pilot flow flowing into the pilot port 23B is decreased to zero, as shown in FIG. 3. With this operation, the pressure in the spring chamber 6b of the flow control valve 4 increases so that the valve spool 4a advances to close the bypass passage 5. As a result, the flow rate of the operational fluid supplied to the control valve 13 is increased as the load pressure increases. When the load pressure reaches P2, the flow rate reaches the maximum rate Q2, making it possible to generate a sufficient assisting force.

The bypass control valve 20 used in the first embodiment is a ball poppet type, but the bypass control valve 20 is not limited thereto and various bypass control valves according to the following embodiments may be used.

Figure 5:
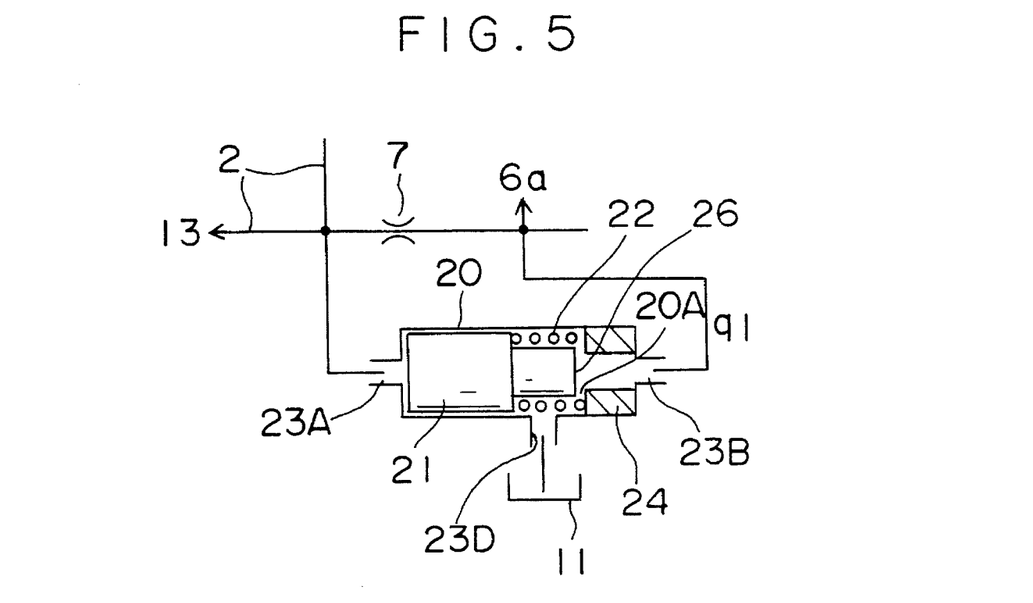
FIG. 5 is a sectional view of a bypass control valve according to a second embodiment of the present invention.

FIG. 5 shows a bypass control valve 20 according to a second embodiment of the present invention. This bypass control valve 20 is a modified ball poppet type in which a projection 26 is projected from the second end surface of the control spool 21, and the projection 26 has a flat end surface which is capable of contracting the inner opening of a passage communicating with the pilot port 23B. The bypass control valve 20 of the present embodiment operates in the same manner as the bypass control valve 20 according to the first embodiment.

Figure 6:
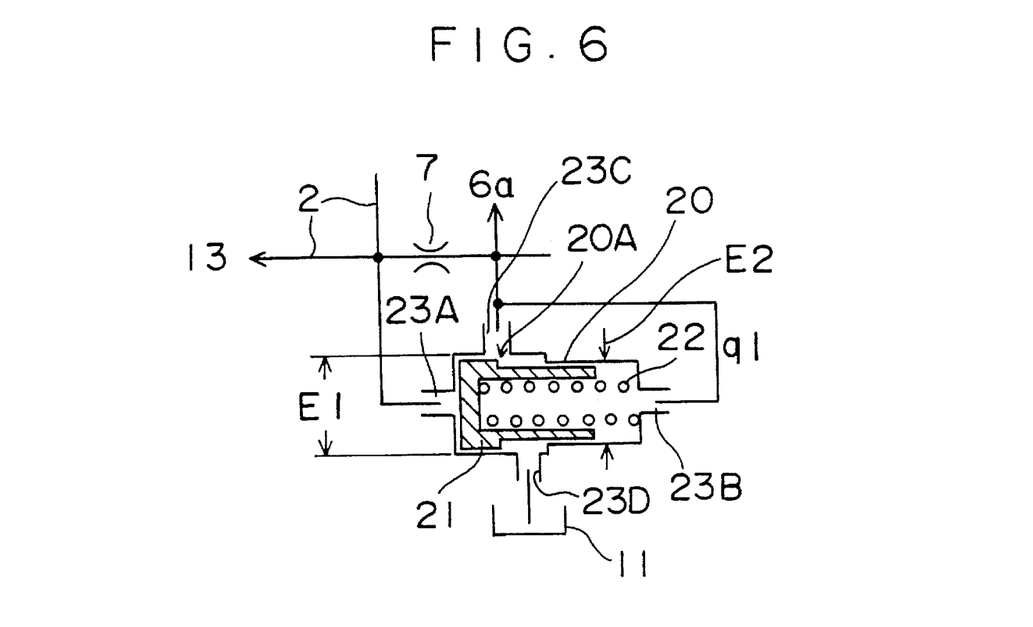
FIG. 6 is a sectional view of a bypass control valve according to a third embodiment of the present invention.

FIG. 6 shows a bypass control valve 20 according to a third embodiment of the present invention. In this bypass control valve 20, a stepped hole is formed for receiving the control spool 21. In detail, the hole has a larger diameter portion formed over an area adjacent to the load pressure introduction port 23A and a smaller diameter portion formed over an area adjacent the pilot port 23B. The larger diameter portion has a diameter E1 which is larger than the diameter E2 of the smaller diameter portion. The control spool 21 also has a larger diameter portion and a smaller diameter portion having diameters slightly smaller than the diameters E1 and E2, respectively. A variable throttle 20A is formed between a stepped portion of the control spool 21 formed between its larger and smaller diameter portions and an inlet passage 23C which is connected to the spring chamber 6a of the flow control valve 4. In the bypass control valve 20 of the present invention, the control spool 21 is axially moved in accordance with a differential pressure produced at the control orifice 7 so that the variable orifice 20A is opened and closed.

Figure 7:
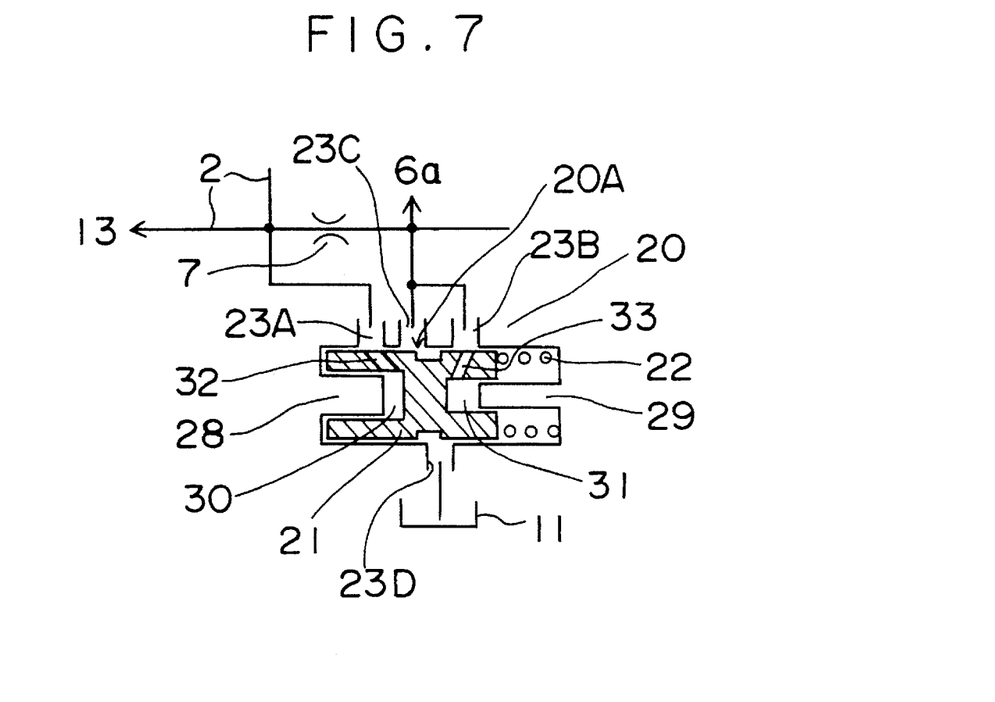
FIG. 7 is a sectional view of a bypass control valve according to a fourth embodiment of the present invention.

FIG. 7 shows a bypass control valve 20 according to a fourth embodiment of the present invention. In this bypass control valve 20, a first rod 28 is provided at its one axial end, and a second rod 29 having a cross section smaller than that of the first rod 28 is formed at the other axial end. The first rod 28 is received by a hole formed in a first end of a control spool 21 to form a first pressure receiving chamber 30, while the second rod 29 is received by a hole formed in a second end of the control spool 21 to form a second pressure receiving chamber 31. The bypass control valve 20 is provided with a load pressure introduction port 23A which is connected to the upstream side of the control orifice 7 and a pilot port 23B which is connected to the downstream side of the control orifice 7. In the control spool 21, a first connection hole 32 is formed to introduce load pressure from the load pressure introduction port 23A to the first pressure receiving chamber 30. Also, a second connection hole 33 is formed to introduce pilot pressure from the pilot port 23B to the second pressure receiving chamber 31. A variable throttle 20A is formed between a stepped portion of the control spool 21 and an inlet passage 23C which is connected to the spring chamber 6a of the flow control valve 4. In the bypass control valve 20 of the present invention, the control spool 21 is axially moved in accordance with a differential pressure produced at the control orifice 7 so that the variable throttle 20A is opened and closed.

Figure 8:
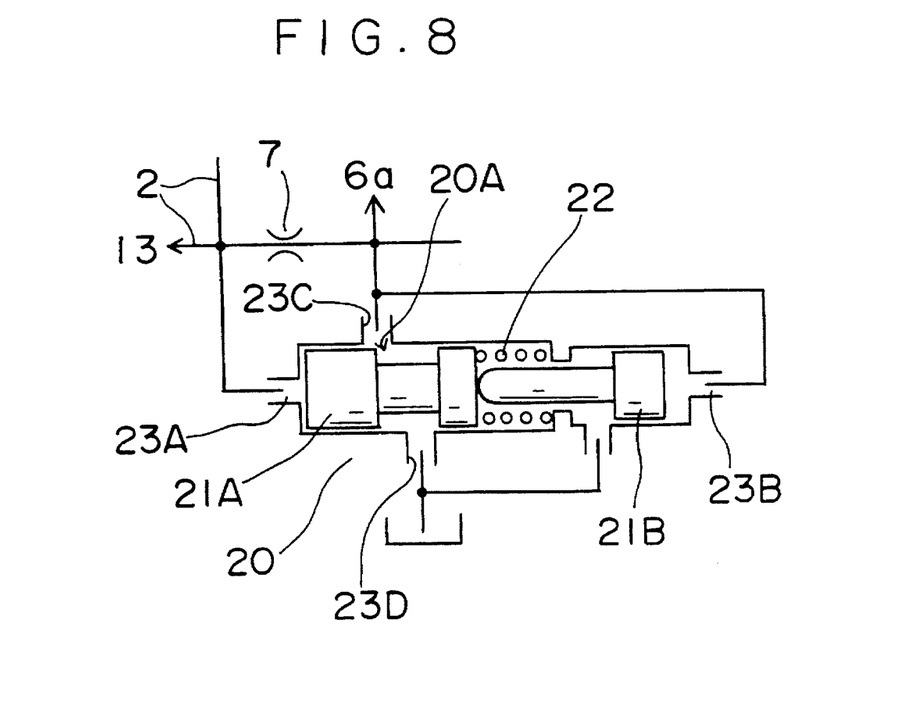
FIG. 8 is a sectional view of a bypass control valve according to a fifth embodiment of the present invention.

FIG. 8 shows a bypass control valve 20 according to a fifth embodiment of the present invention. In this bypass control valve 20, a main spool 21A and a sub spool 21B having a sectional area smaller than that of the main spool 21A are used. The main spool 21A is received in a first hole having a load pressure introduction port 23A, an inlet port 23C, and a drain port 23D. The main spool 21A is urged by a spring 22 to move toward the load pressure introduction port 23A so that a variable throttle 20A formed between a stepped portion of the main spool 21A and the inlet port 23C is opened. The sub spool 21B is received in a second hole having a pilot port 23B, and is provided with a projection contacting the main spool 21A. In the bypass control valve 20 of the present invention, the main spool 21A and the sub spool 21B are axially moved together in accordance with a differential pressure produced at the control orifice 7 so that the variable orifice 20A is opened and closed.

Figure 9:
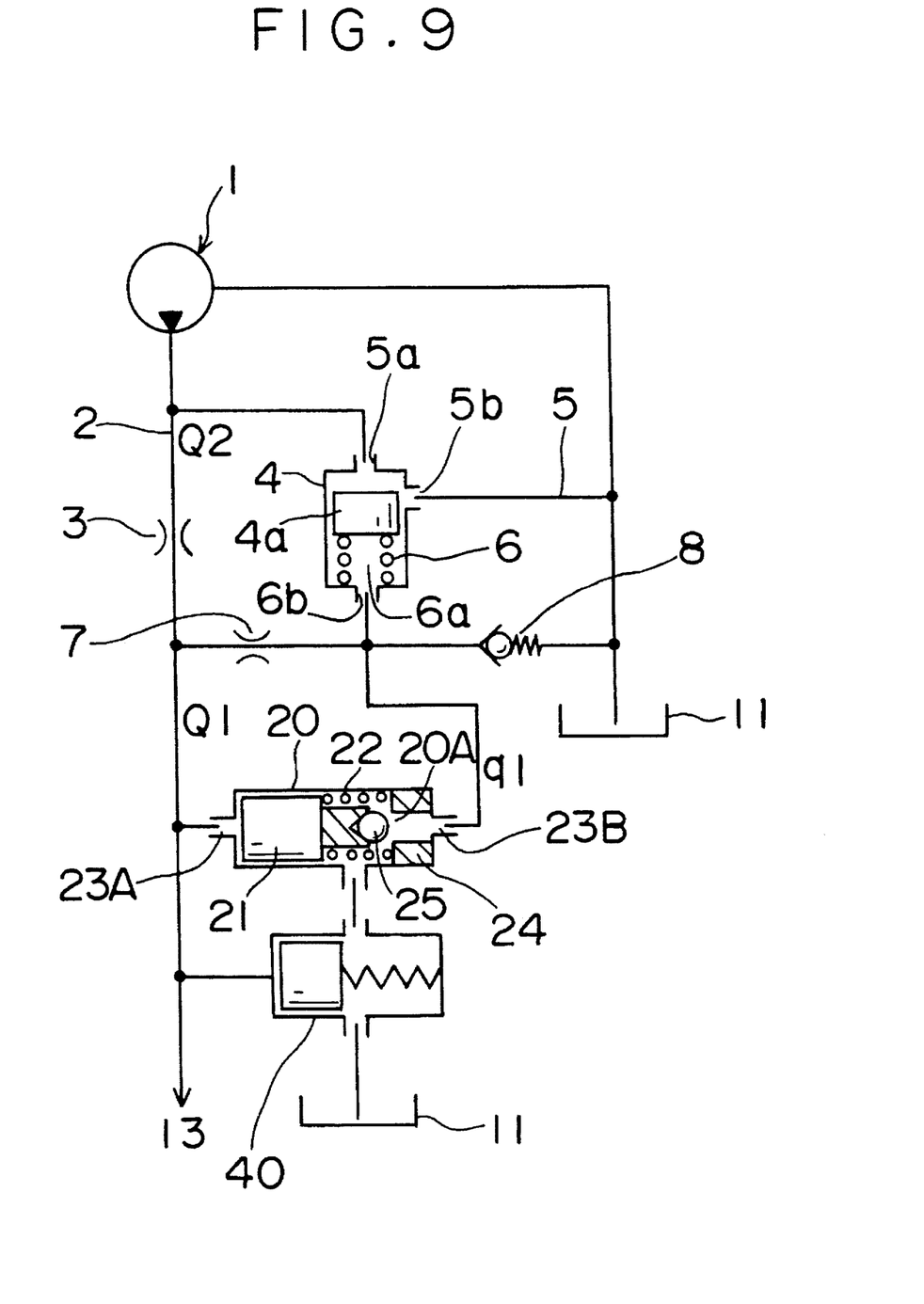
FIG. 9 is a diagram showing a main portion of a power steering apparatus according to a sixth embodiment of the present invention.

FIG. 9 shows a sixth embodiment of the present invention. This embodiment is the same as the first embodiment except that an additional control valve is added to improve the safety. In detail, a safety valve 40 comprising a spool and a spring is disposed between the bypass control valve 20 and the reservoir 11. The safety valve 40 is also connected to the supply passage 2 so that load pressure acts on the spool of the safety valve 40. In the case where the bypass control valve 20 is left opened due to a malfunction even though the load pressure increases, the safety valve 40 is closed when the load pressure reaches a predetermined level P2. As a result, the flow control valve 4 normally operates to supply operational fluid at a flow rate Q2.

In the above embodiments, the flow rate of operational fluid is maintained constant by the flow control valve 4. However, a variable throttle whose opening area varies in accordance with vehicle speed or the rotational speed of an engine may be used as the metering orifice to change the flow rate according to the vehicle speed or the rotational speed of the engine.

Obviously, numerous modifications and variations of the present invention are possible in light of the above teachings. It is therefore to be understood that within the scope of the appended claims, the present invention may be practiced otherwise than as specifically described herein.

What is claimed is:

1. A hydraulic power steering apparatus having a pump for supplying an operational fluid, a power cylinder, a reservoir, and a control valve connected to said pump, said power cylinder and said reservoir and responsive to steering operation for controlling supply of the operational fluid to said power cylinder, said power steering apparatus comprising;

a metering orifice disposed in the middle of a supply passage connecting said pump and said control valve;

a flow control valve which is disposed in a bypass passage connected to the supply passage at the upstream side of said metering orifice and which comprises a valve spool and a spring disposed in a spring chamber formed at the back of the valve spool and connected to the supply passage at the downstream side of said metering orifice via a control orifice so as to open and close the bypass passage in accordance with a pressure drop across said metering orifice; and a bypass control valve disposed between the spring chamber of said flow control valve and said reservoir so as to increase the amount of bypassed fluid by controlling the pressure in the spring chamber, wherein said bypass control valve has a control spool, a load pressure introduction port connected to the upstream side of the control orifice for leading load pressure to a first end of said control spool, a pilot port connected to the downstream side of the control orifice for leading the pressure in the spring chamber of said flow control valve to a second end of said control spool, and a spring disposed in a chamber formed between said control spool and said pilot port, and wherein a pressure receiving area of the second end of the control spool is smaller than that of the first end of the control spool.

2. A hydraulic power steering apparatus according to claim 1, wherein said control spool of said bypass control valve is provided with a ball which is disposed at the second end of said control spool and contacts an inner opening of a passage communicating with said pilot port to form a pressure receiving area smaller than the first end of said control spool, and a drain port is formed to drain operational fluid from the chamber to said reservoir.

3. A hydraulic power steering apparatus according to claim 1, wherein said control spool of said bypass control valve is provided with a projection projected from the second end of said control spool and having a flat end which contacts an inner opening of a passage communicating with said pilot port to form a pressure receiving area smaller than the first end of said control spool, and a drain port is formed to drain operational fluid from the chamber to said reservoir.

4. A hydraulic power steering apparatus according to claim 1, wherein said control spool of said bypass control valve has a larger diameters portion providing said first end and a smaller diameter portion providing said second end, said bypass control valve is provided with an inlet port connected to the spring chamber of said flow control valve, and a drain port which is connected to said reservoir, and a variable throttle is formed between a stepped portion between the large diameter portion and the small diameter portion of the control spool and said inlet port for controlling the flow of operational fluid from the inlet port to the drain port.

5. A hydraulic power steering apparatus according to claim 1, wherein said bypass control valve is provided with a first rod and a second rod having a cross section smaller than that of the first rod which are received by holes formed in the first and second ends of the control spool to form first and second pressure receiving chambers, the control spool has a first connection hole for connecting the load pressure introduction port and the first pressure receiving chamber and a second connection hole for connecting the pilot port and the second pressure receiving chamber, said bypass control valve is further provided with an inlet port connected to the spring chamber of said flow control valve and a drain port which is connected to said reservoir, and a variable throttle is formed between a stepped portion formed on the control spool and said inlet port for controlling the flow of operational fluid from the inlet port to the drain port.

6. A hydraulic power steering apparatus according to claim 1, wherein said control spool of said bypass control valve is composed of a main spool received in a first hole and a sub spool received in a second hole and having a rod contacting the main spool, said first hole is provided with said load pressure introduction port for applying load pressure to the main spool, an inlet port connected to the spring chamber of said flow control valve and a drain port connected to said reservoir, a variable throttle is formed between a stepped portion formed on the control spool and said inlet port for controlling the flow of operational fluid from the inlet port to the drain port, and said second hole is provided with said pilot port for applying the pressure in the spring chamber of said flow control valve to the sub spool.

7. A hydraulic power steering apparatus according to claim 1, further comprising a safety valve which is disposed between said bypass control valve and said reservoir and operates to stop the flow of fluid from said bypass control valve to said reservoir when the back pressure of said control valve reaches a predetermined level.

* * * * *